US011243590B2

(12) United States Patent
Rhinehart et al.

(10) Patent No.: US 11,243,590 B2
(45) Date of Patent: Feb. 8, 2022

(54) SYSTEMS AND METHODS FOR MINIMIZING SYSTEM HARDWARE THROTTLING DUE TO POWER SUPPLY UNIT ENVIRONMENTAL EFFECTIVE CAPACITY

(71) Applicant: Dell Products L.P., Round Rock, TX (US)

(72) Inventors: Aaron M. Rhinehart, Georgetown, TX (US); Doug E. Messick, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/586,491

(22) Filed: Sep. 27, 2019

(65) Prior Publication Data
US 2021/0096623 A1    Apr. 1, 2021

(51) Int. Cl.
*G06F 1/00*    (2006.01)
*G06F 1/26*    (2006.01)
*G06F 1/3296*    (2019.01)
*G06F 1/28*    (2006.01)

(52) U.S. Cl.
CPC ............... *G06F 1/263* (2013.01); *G06F 1/28* (2013.01); *G06F 1/3296* (2013.01)

(58) Field of Classification Search
CPC ..................................................... G06F 1/263
See application file for complete search history.

(56) References Cited

U.S. PATENT DOCUMENTS

| | | | |
|---|---|---|---|
| 2009/0027033 A1* | 1/2009 | Diab | H02J 1/08 323/318 |
| 2016/0334850 A1* | 11/2016 | Lee | G06F 1/30 |
| 2016/0342186 A1* | 11/2016 | Ragupathi | G06F 1/28 |
| 2017/0220085 A1* | 8/2017 | Guo | G06F 1/26 |
| 2017/0322609 A1* | 11/2017 | Kunnathur Ragupathi | G06F 1/28 |
| 2018/0109391 A1* | 4/2018 | He | H04L 12/10 |

* cited by examiner

*Primary Examiner* — Mohammed H Rehman
(74) *Attorney, Agent, or Firm* — Jackson Walker L.L.P.

(57) ABSTRACT

An information handling system may include at least one information handling resource and a power management subsystem configured to: receive signals from a plurality of power supply units, each signal indicative of an environmental parameter associated with a respective power supply of the plurality of power supply units; determine, for each of the plurality of power supply units, a respective environmental effective power capacity based on the respective signal indicative of the environmental parameter for such power supply unit and an environmental profile for such power supply unit; and manage power consumption of the at least one information handling resource based on environmental effective power capacities of the plurality of power supply units.

18 Claims, 2 Drawing Sheets

SYSTEMS AND METHODS FOR MINIMIZING SYSTEM HARDWARE THROTTLING DUE TO POWER SUPPLY UNIT ENVIRONMENTAL EFFECTIVE CAPACITY

TECHNICAL FIELD

The present disclosure relates in general to information handling systems, and more particularly to systems and methods for minimizing system hardware throttling due to power supply environmental effective capacity.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Existing power supply units often have a rated effective output power capacity that is characterized for temperatures generally found in controlled temperature datacenter environments. However, occasionally it may be desired to use an information handling system in a data center in which temperature cannot be maintained within those temperatures for which power supply units of the information handling system are rated. In other words, while an effective power capacity of a power supply unit may meet its rated value with typical ambient temperatures (e.g., 5° C. to 35° C.), the effective capacity may be significantly reduced in high-temperature (e.g., 35° C. to 55° C.) and low-temperature (e.g., −20° C. to 5° C.) environments.

Power management systems of traditional information handling systems typically only take into account the rated effective power capacities of power supply units when controlling power use by components of information handling systems. Accordingly, when such information handling systems are used in extreme temperature environments, power may be demanded in excess of a reduced power capacity for a power supply unit, which may cause over-temperature or over-current conditions to occur within a power supply unit, to which a power supply unit may respond by taking protective measures such as powering down the power supply unit to prevent damage to the power supply unit. Such powering down of a power supply unit reduces overall power capacity within an information handling system, which the information handling system may respond to by throttling components of the information handling system, leading to decreased performance.

SUMMARY

In accordance with the teachings of the present disclosure, the disadvantages and problems associated with existing approaches to power management may be reduced or eliminated.

In accordance with embodiments of the present disclosure, an information handling system may include at least one information handling resource and a power management subsystem configured to: receive signals from a plurality of power supply units, each signal indicative of an environmental parameter associated with a respective power supply of the plurality of power supply units; determine, for each of the plurality of power supply units, a respective environmental effective power capacity based on the respective signal indicative of the environmental parameter for such power supply unit and an environmental profile for such power supply unit; and manage power consumption of the at least one information handling resource based on environmental effective power capacities of the plurality of power supply units.

In accordance with these and other embodiments of the present disclosure, a method may include: receiving signals from a plurality of power supply units, each signal indicative of an environmental parameter associated with a respective power supply of the plurality of power supply units; determining, for each of the plurality of power supply units, a respective environmental effective power capacity based on the respective signal indicative of the environmental parameter for such power supply unit and an environmental profile for such power supply unit; and managing power consumption of at least one information handling resource based on environmental effective power capacities of the plurality of power supply units.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: receive signals from a plurality of power supply units, each signal indicative of an environmental parameter associated with a respective power supply of the plurality of power supply units; determine, for each of the plurality of power supply units, a respective environmental effective power capacity based on the respective signal indicative of the environmental parameter for such power supply unit and an environmental profile for such power supply unit; and manage power consumption of at least one information handling resource based on environmental effective power capacities of the plurality of power supply units.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
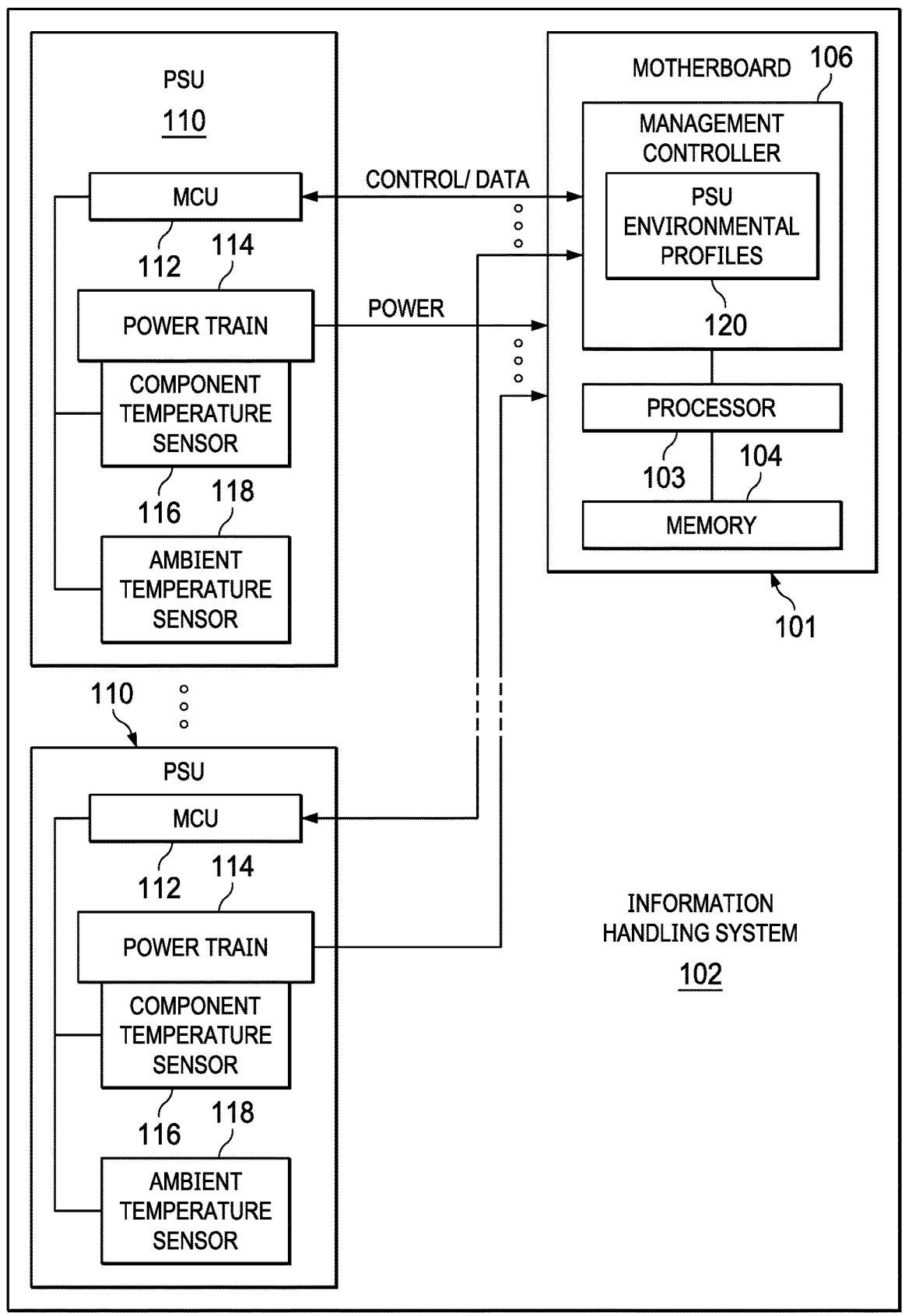
FIG. 1 illustrates a block diagram of an example information handling system, in accordance with embodiments of the present disclosure.
Figure 2:
FIG. 2 illustrates example ambient temperature-based PSU environmental profiles for hypothetical PSUs represented in tabular form, in accordance with embodiments of the present disclosure.
Figure 3:
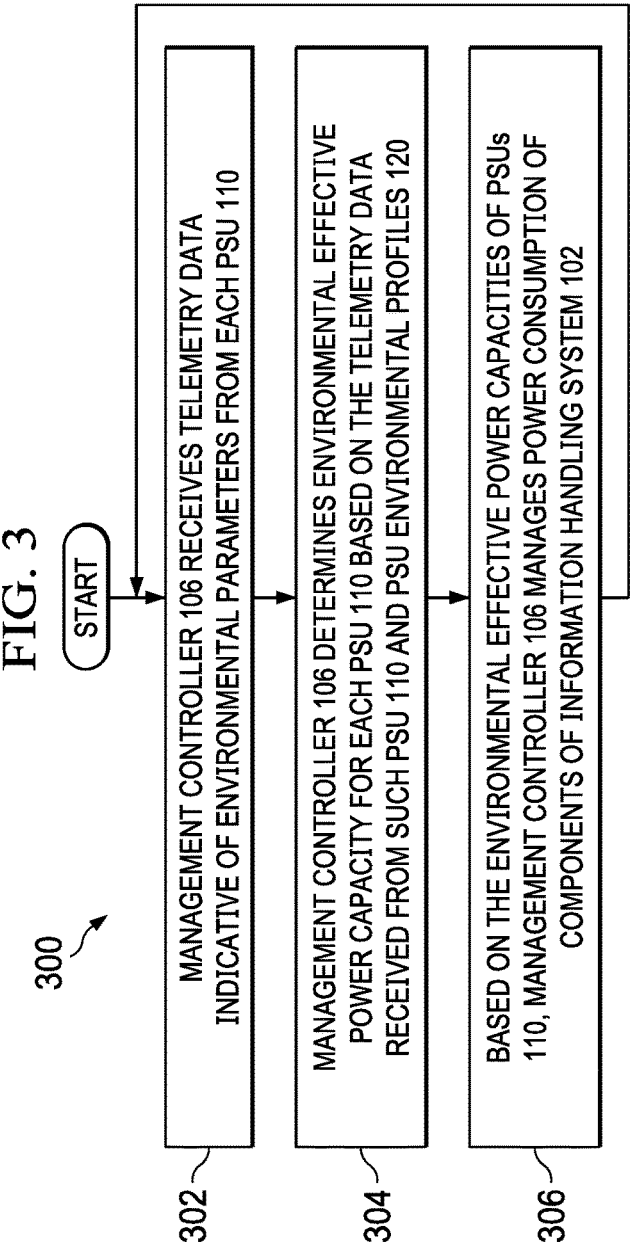
FIG. 3 illustrates a flow chart of an example method for using environmental effective power capacities of PSUs for power management of an information handling system, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a plurality of power supply units (PSUs) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSUs 110 may communicate sensor information associated with component temperature sensor 116 and ambient temperature sensor 118 to management controller 106, from which management controller 106 may take action to prevent over-temperature conditions. For example, if component temperature sensor 116 reaches a threshold temperature level, management controller 106 may cause throttling of components of information handling system 102 (e.g., processor 103) to prevent overheating by a PSU 110. As another example, as discussed in greater detail below with respect to FIGS. 2 and 3, management controller 106 may receive telemetry data regarding an ambient temperature sensed by an ambient temperature sensor 118 associated with a PSU 110 and/or one or more other environmental conditions associated with the PSU 110, and based on an environmental profile for such PSU 110, apply an environmental effective power capacity for the PSU 110 and incorporate such environmental effective power capacity for the PSU 110 into its power management of information handling system 102.

As shown in FIG. 1, management controller 106 may have stored thereon or in computer-readable media accessible thereto PSU environmental profiles 120. PSU environmental profiles 120 may define for each of a plurality of PSUs 110 the environmental effective power capacity of such PSU 110 as a function of one or more environmental parameters. Such one or more environmental parameters may include an ambient temperature associated with a PSU 110, an input voltage to the PSU 110, an air pressure at or near the PSU 110, an air density at or near the PSU 110, and/or one or more other environmental parameters. PSU environmental profiles 120 may be represented in any suitable manner, including as tabular data associating given values of a sensed environmental parameter (e.g., temperature) to an environmental effective power capacity of a PSU 110 at such given value, an equation (e.g., a polynomial) that calculates an environmental effective power capacity of a PSU 110 based on a given value of a sensed environmental parameter (e.g., temperature), or any other suitable representation. FIG. 1 shows PSU environmental profiles 120 as stored in computer-readable media integral or otherwise accessible to management controller 106, meaning management controller 106 may store PSU environmental profiles 120 for many different types of PSUs 110 that may be disposed within information handling system 102, thus allowing management controller 106 to support a mix of types of PSUs 110 with different characteristics. However, in some embodiments, each PSU 110 may store its own PSU environmental profile 120 in computer-readable media integral to the PSU 110, which may then be communicated from PSU 110 to management controller 106.

Turning briefly to FIG. 2, FIG. 2 illustrates example ambient temperature-based PSU environmental profiles 120 for hypothetical PSUs 110 represented in tabular form, in accordance with embodiments of the present disclosure. Example PSU environmental profiles 120 shown in FIG. 2 associate for each of a plurality of types of PSUs 110 (e.g., manufacturer, model number, etc.) a plurality of given temperatures and an environmental effective power capacity of such type of PSU 110 at each of such temperatures.

Turning again to FIG. 1, a PSU 110 may include any system, device, or apparatus configured to supply electrical current to one or more information handling resources of information handling system 102. As shown in FIG. 1, PSU 110 may include a microcontroller unit (MCU) 112, a power train 114, a component temperature sensor 116, and an ambient temperature sensor 118.

MCU 112 may comprise a microprocessor, DSP, ASIC, FPGA, EEPROM, or any combination thereof, or any other device, system, or apparatus for controlling operation of its associated PSU 110. As such, MCU 112 may comprise firmware, logic, and/or data for controlling functionality of such PSU 110.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator).

Component temperature sensor 116 may be communicatively coupled to MCU 112 and may include any system, device, or apparatus (e.g., a thermometer, thermistor, etc.) configured to communicate a signal to MCU 112 indicative of a temperature at or near a component of power train 114 (e.g., a converter, heatsink, transistor, or other component of power train 114).

Ambient temperature sensor 118 may be communicatively coupled to MCU 112 (and/or management controller 106) and may include any system, device, or apparatus (e.g., a thermometer, thermistor, etc.) configured to communicate a signal to MCU 112 indicative of a temperature ambient to PSU 110 (e.g., an inlet air temperature for airflow into or by PSU 110). Although FIG. 1 depicts ambient temperature sensor 118 as integral to PSU 110, in some embodiments ambient temperature sensor may be integral to information handling system 102 but external to PSU 110.

In addition to motherboard 101, processor 103, memory 104, management controller 106, and PSU 110, information handling system 102 may include one or more other information handling resources. For example, in some embodiments, information handling system 102 may include one or more other sensors for sensing environmental parameters associated with a PSU 110, including without limitation an input voltage to a PSU 110, an air pressure, and an air density.

FIG. 3 illustrates a flow chart of an example method 300 for using environmental effective power capacities of PSUs 110 for power management of an information handling system 102, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 106 (or a power management subsystem of information handling system 102) may receive telemetry data indicative of environmental parameters (e.g., from ambient temperature sensor 118 and/or one or more other sensors) from each PSU 110. In some embodiments, such telemetry data may be collected from each PSU 110 via a Power Management Bus (PMBus) interface coupling management controller 106 to each of PSUs 110.

At step 304, management controller 106 (or a power management subsystem of information handling system 102) may, for each PSU 110, based on the telemetry data received from such PSU 110 and based on PSU environmental profiles 120, determine an environmental effective power capacity for such PSU 110.

At step 306, based on the environmental effective power capacities of PSUs 110, management controller 106 (or a power management subsystem of information handling system 102) may manage power consumption of components of information handling system 102. For example, management controller 106 (or a power management subsystem of information handling system 102) may limit a maximum sustained power consumption and/or peak power consumption of components of information handling system 102 based on the environmental effective power capacities of PSUs 110. After completion of step 306, method 300 may return again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   at least one information handling resource; and
   a power management subsystem configured to:
      receive signals from a plurality of power supply units, each signal indicative of an environmental parameter associated with a respective power supply of the plurality of power supply units;
      determine, for each of the plurality of power supply units, a respective environmental effective power capacity based on the respective signal indicative of the environmental parameter for such power supply unit and an environmental profile for such power supply unit; and
      manage power consumption of the at least one information handling resource based on environmental effective power capacities of the plurality of power supply units;
      wherein managing power consumption of the at least one information handling resource comprises at least one of:
         limiting a maximum sustained power consumption for the at least one information handling resource; and
         limiting a peak power consumption for the at least one information handling resource.

2. The information handling system of claim 1, wherein the environmental parameter comprises an ambient temperature associated with the information handling system.

3. The information handling system of claim 1, wherein the environmental parameter comprises an air density associated with the respective power supply unit.

4. The information handling system of claim 1, wherein the environmental profile defines for the respective power supply unit the environmental effective power capacity of such power supply unit as a function of the environmental parameter for such power supply unit.

5. The information handling system of claim 1, wherein the environmental parameter comprises one of an input voltage and an air pressure associated with the respective power supply unit.

6. The information handling system of claim 1, wherein managing power consumption of the at least one information handling resource comprises limiting a peak power consumption for the at least one information handling resource.

7. A method comprising:
   receiving signals from a plurality of power supply units, each signal indicative of an environmental parameter associated with a respective power supply of the plurality of power supply units;
   determining, for each of the plurality of power supply units, a respective environmental effective power capacity based on the respective signal indicative of the environmental parameter for such power supply unit and an environmental profile for such power supply unit; and managing power consumption of at least one information handling resource based on environmental effective power capacities of the plurality of power supply units;

wherein managing power consumption of the at least one information handling resource comprises at least one of:
limiting a maximum sustained power consumption for the at least one information handling resource; and
limiting a peak power consumption for the at least one information handling resource.

8. The method of claim 7, wherein the environmental parameter comprises an ambient temperature.

9. The method of claim 7, wherein the environmental parameter comprises an air density associated with the respective power supply unit.

10. The method of claim 7, wherein the environmental profile defines for the respective power supply unit the environmental effective power capacity of such power supply unit as a function of the environmental parameter for such power supply unit.

11. The method of claim 7, wherein the environmental parameter comprises one of an input voltage and an air pressure associated with the respective power supply unit.

12. The method of claim 7, wherein managing power consumption of the at least one information handling resource comprises limiting a peak power consumption for the at least one information handling resource.

13. An article of manufacture comprising:
a non-transitory computer-readable medium; and
computer-executable instructions carried on the computer-readable medium, the instructions readable by a processor, the instructions, when read and executed, for causing the processor to:
receive signals from a plurality of power supply units, each signal indicative of an environmental parameter associated with a respective power supply of the plurality of power supply units;
determine, for each of the plurality of power supply units, a respective environmental effective power capacity based on the respective signal indicative of the environmental parameter for such power supply unit and an environmental profile for such power supply unit; and
manage power consumption of at least one information handling resource based on environmental effective power capacities of the plurality of power supply units;
wherein managing power consumption of the at least one information handling resource comprises at least one of:
limiting a maximum sustained power consumption for the at least one information handling resource; and
limiting a peak power consumption for the at least one information handling resource.

14. The article of claim 13, wherein the environmental parameter comprises an ambient temperature.

15. The article of claim 13, wherein the environmental parameter comprises an air density associated with the respective power supply unit.

16. The article of claim 13, wherein the environmental profile defines for the respective power supply unit the environmental effective power capacity of such power supply unit as a function of the environmental parameter for such power supply unit.

17. The article of claim 13, wherein the environmental parameter comprises one of an input voltage and an air pressure associated with the respective power supply unit.

18. The article of claim 13, wherein managing power consumption of the at least one information handling resource comprises limiting a peak power consumption for the at least one information handling resource.

* * * * *